7421X

N. Scholfield,

Water-Wheel Gate,

Patented Feb. 11, 1833.

N. PETERS, PHOTO-LITHOGRAPHER, WASHINGTON, D. C.

Nathan Scholfield.

The Schedule referred to in these Letters Patent and making part of the same containing a description in the words of the said Nathan Scholfield himself, of his Improvement in the Machine for regulating the motion of water wheels, wind Mills, Steam engines &c. called the Pendulum Regulator.

To all to whom these presents shall come,

Be it known, that I, Nathan Scholfield of Montville in the County of New London and State of Connecticut, have invented a new and useful machine for regulating the motion of water wheels, wind Mills, Steam engines, &c, called the Pendulum Regulator, and that the following is a full and exact description of the construction and operation of the said machine, as invented by me.

The principle of this regulator consists in a pendulum put in motion by a cam whose revolutions continually carry it forward in one direction from its perpendicular or natural position, and then leaves it at liberty to fall back causing it to perform continual vibrations. From the nature of the pendulum it is evident, that gravity will cause it to descend or move through similar parts of its oscillations in equal times at each succeeding vibration; therefore if the motion of the wheel is uniform the vibrations of the pendulum will be uniform also, but if the motion of the wheel is slower, it will suffer the pendulum to traverse farther, but if the motion is quicker the pendulum will be checked sooner by the cam - consequently, before it will have described so great an arc. Therefore the motion of the pendulum indicates, or tests, the velocity of the wheel or engine during each vibration.

Figure 1:
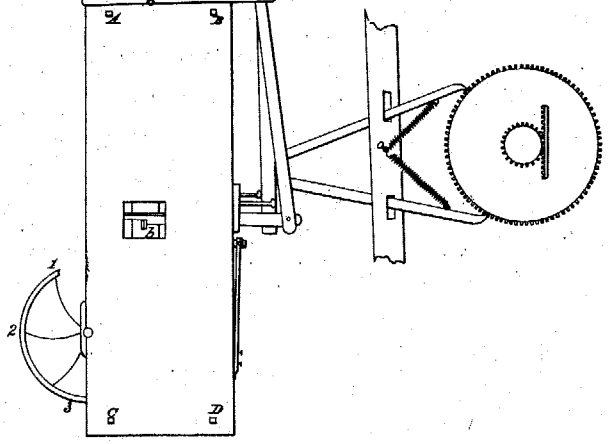

A. B. C. D. Fig 1st represents the frame, a side view, made of plank from 1¼ to 1½ inch thick about 5 feet high and 1 foot wide being the dimensions I usually make them for water wheels. I sometimes make them by framing, or by pannel work, they may also be made of cast iron:- the two sides are fastened together by joint bolts, the opposite side being similar to the front:- they are placed at sufficient distance from each other to include the pendulum allowing about half an inch on each side.

1.2.3. is a cam made to revolve by a pulley on one end of the shaft in the direction 1.2.3.- one side of which strikes the pendulum P and moves it forward till it comes to the opposite or waning side, when it falls back till it is struck by the cam again and so on. L.L. and L f are two levers suspended from the caps on the top of the frame into each of which is fastened a latch made of iron called a test latch, lying horizontal one on each side of the pendulum, having a notch at n, faced with steel, to catch on the pin or bolt at b. being a square piece of steel, fastened into the pendulum, one of which latches is made to catch when the motion is too fast and the other when too slow, and are thereby carried forward by the pendulum together with their levers, into each of which there is a catch r r & H.H which are moved likewise, and working in the cogwheel 3.4.5. move it one way or the other and raise or lower the gate, as occasion may require, the gate being attached in the usual manner by rack and pinion.

E.E. is a guide for the catches with mortises or gaines for them to move in, being so made that the catches in their natural position will just clear the cogwheel. I&I. are two spiral springs made of wire to hold the lower catch up and to bring them back when carried forward:- l j is a block connecting the two sides of the machine a view of which may be seen at Fig 4th having gaines cut to guide each of the latches:- i i are two screws with large heads against which the levers L.L. and L.f. bear when in their natural position. S is a spring connected to another latch situated immediately below the latch that shuts the gate and is so calculated as to catch when the motion is not too fast and raises the other one up to prevent

Figure 3:
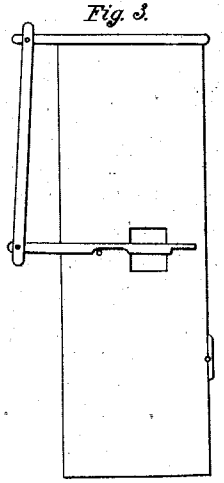
Figure 2:
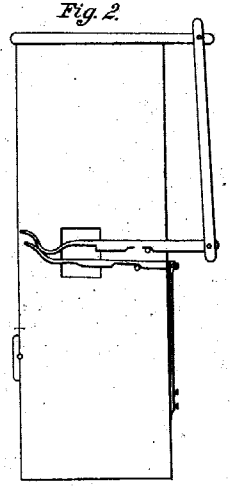

X7421 it from catching at such times.] Fig 2 & 3 are views of the inside of the machine; under each of the test latches there is a pin or screw k k & k, over which they are moved, and as the slant at d g or d comes to them they cause the latches to rise and unlatch from the pendulum leaving it at liberty to fall back by its own gravity.

Now these test latches are so situated that, when the motion is so fast that the pendulum will not have passed through so great a space as usual before it is struck by the cam, the test latch w.v. will catch on the bolt, it not having passed far enough for either of the other latches to catch and it will be moved forward and tend to lower the gate; but if its motion is right, that is neither too fast or too slow, the latch m.t. must be so situated as just to catch on the bolt and as the pendulum moves forward and the latches being bent in the form as represented, the latch w.v. will be raised above the bolt by the latch m.t. and prevented from catching.

But when its motion is too slow the pendulum will pass farther allowing the latch a.e. (which is situated farther back) to catch and the latch m.t. at the same time preventing w.v. from catching the latch a.e. will be carried forward and raise the gate.

Figure 4:
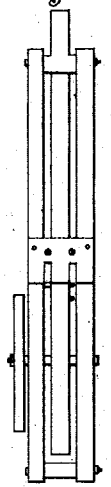

Fig. 4th is a front view without the levers and latches. R.R. is the pulley by which it is operated.

Figure 5:
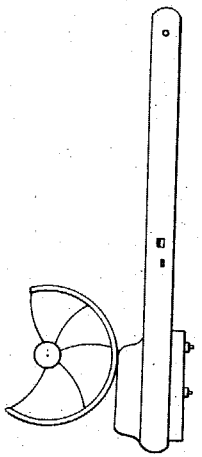

Fig. 5th is a view of the pendulum and cam – the cam is made of cast iron. G is a guard block lined with iron on which the cam strikes. W is a weight with a slit longitudinally and fastened on with bolts or screws so as to be raised or lowered to suit the vibrations of the pendulum to the velocity required. for instance, if you wish to increase the velocity of the wheel, the weight must be raised, but to decrease it must be lowered.

Figure 6:
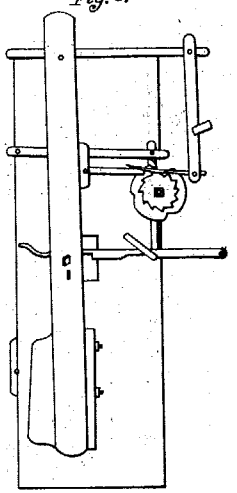

Theory & experience concur in teaching us that some wheels such as large overshot and breast wheels and the like, and those operating a large quantity of machinery require a considerable time to be affected by an addition or diminution of water in consequence of the time required in filling or emptying and the inertia to be overcome which in some cases is very great, so that regulators on the principle of the flying balls, or those that are constantly acting while the motion is not right will generally have carried the gate too high or too low by the time the wheel will have attained its proper motion, and in order to guard effectually against this error by the applica-tion of the Pendulum Regulator, I use an additional apparatus for some wheels, described in Fig. 6th, the effect of which is to allow the gate to be moved farther at a time and wait longer for the effect before it is moved again:- this apparatus consists in a catch & cam applied in the following manner. 1.2.3. represents the cam wheel about 3 inches in diameter made of cast iron or other metal with cogs on one side as represented in the figure, one of which cogs must be left blank or cut out; there may be either 2.3.4. or more cams on the circumference of the wheel having about 12 notches or cogs including the blank; now this cog and cam is moved by the catch c attached to the pendulum one notch at each vibration. a.b is a lever having a notch or projection resting on the cam and as the wheel revolves this projection falls between the cams once in 2.3.4. or more vibrations of the pendulum, according to the number of cogs opposite each cam. h h is an iron slide bent at the bottom to come under the test latches and connected to the lever, and as the lever rises on the cam it raises the latches and prevents them from catching except when the lever falls between the cams which may be once in 1.2.3. 4. or more seconds as occasion may require. But with this arrangement the motion of the wheel might sometimes be suddenly altered while the latches were raised and prevented from catching, were it not for one blank cog which as it comes to the top prevents the catch on the pendulum from moving it any farther and in that situation the projection on the lever falls between the cams and leaves the latches at liberty to catch at any instant, and after one of the latches have been moved the lever to which it is connected will move the catch lever d d placed on the same shaft with the other levers and between them with a piece of plated iron, m. fastened to the back of it, and projecting over each of the others.

Figure 7:
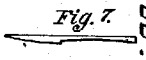

To this lever is attached the catch c. d. which is so calculated as to move the cogwheel only when it comes to the place where the cog is missing - for at other times it cannot get between the cogs being made in the form as in Fig. 7th.

By this arrangement, the regulator is ready to operate on the gate at any instant and cannot move the gate more than once in 2. 3. 4. or more vibrations, as occasion may require.

Those for steam engines I make in the same manner as for water wheels, only they do not require to be more than half the dimensions described.

I sometimes use pins or rollers in the side of a pulley to move the pendulum; in that case it may move twice in each revolution, as in case of the cam it will move but once.

The principal advantages possessed by this regulator over those in common use operating on the principle of the flying balls are, by moving the gate to a water wheel. or turning the valve of a steam engine suddenly any given quantity and then waiting any required time for the effect, they may be moved farther in any given time without the danger of carrying them too far, as is the case with the other kind which move the gate gradually till the motion is right, thereby requiring a much longer time and generally carrying it too far.

The Pendulum Regulator requires much less room than the other kind, and dispenses with a considerable gearing and expense in attaching to a gate, requiring, nothing but a rack. a pinion and cogwheel on one shaft.

What I claim as my invention is the application of the Pendulum on the principle herein described, and the arrangement and application of the different parts of the machine as a regulator for water wheels, steam engines &c. - not however intending to confine myself to the exact arrangement herein set forth, but to use any

X7421 other in which the same principle is employed, and a similar effect produced.

Witnesses — Nathan Schofield

Chas. P. Jones

L. H. Machen (Gr in port folio)

[2050 wds.]